United States Patent [19]

Winter

[11] 4,033,319
[45] July 5, 1977

[54] BLADE GUIDE AND SLAB SUPPORT FOR LAPIDARY SAW

[76] Inventor: Eugene S. Winter, 415 SE. Date St., College Place, Wash. 99324

[22] Filed: July 25, 1975

[21] Appl. No.: 599,176

[52] U.S. Cl. ................................. 125/13 R; 83/828
[51] Int. Cl.² ............................................. B28D 1/04
[58] Field of Search .......... 125/12, 13, 14; 83/823, 83/827, 828, 829

[56] References Cited

UNITED STATES PATENTS

| 333,339 | 12/1885 | Roberts | 83/828 X |
|---|---|---|---|
| 378,513 | 2/1888 | Marshall | 83/828 |
| 379,165 | 3/1888 | House | 83/828 |
| 848,548 | 3/1907 | Harrold | 83/828 |
| 1,004,204 | 9/1911 | Rost | 83/828 |
| 1,061,869 | 5/1913 | Register | 83/828 |
| 2,491,047 | 12/1949 | Hunt | 125/13 R |
| 2,782,811 | 2/1957 | Johnson | 83/829 X |
| 3,119,420 | 1/1964 | Nelson | 83/828 |
| 3,828,635 | 8/1974 | Smith | 83/823 X |

Primary Examiner—Harold D. Whitehead
Attorney, Agent, or Firm—Eugene D. Farley

[57] ABSTRACT

A blade guide for lapidary saws acts to prevent blade wobble and thus an uneven cut of the resulting slab. The blade guide comprises holder means, mounting means which attach the holder means to the saw table, and guide means which releasably attach to the mounting means to stabilize the saw blade.

1 Claim, 4 Drawing Figures

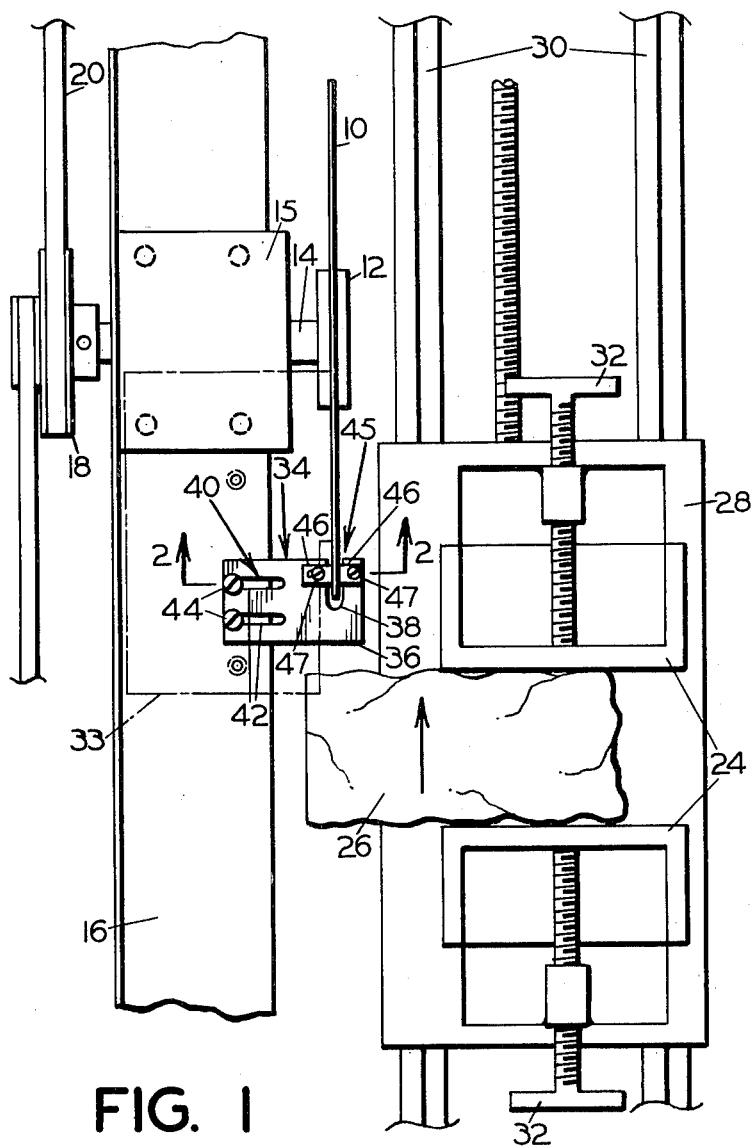
FIG. 1
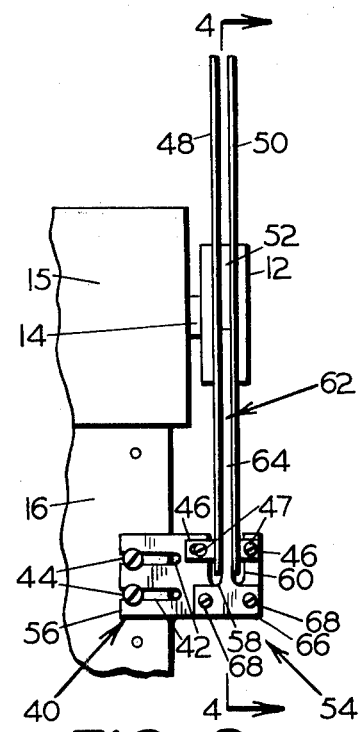
FIG. 3
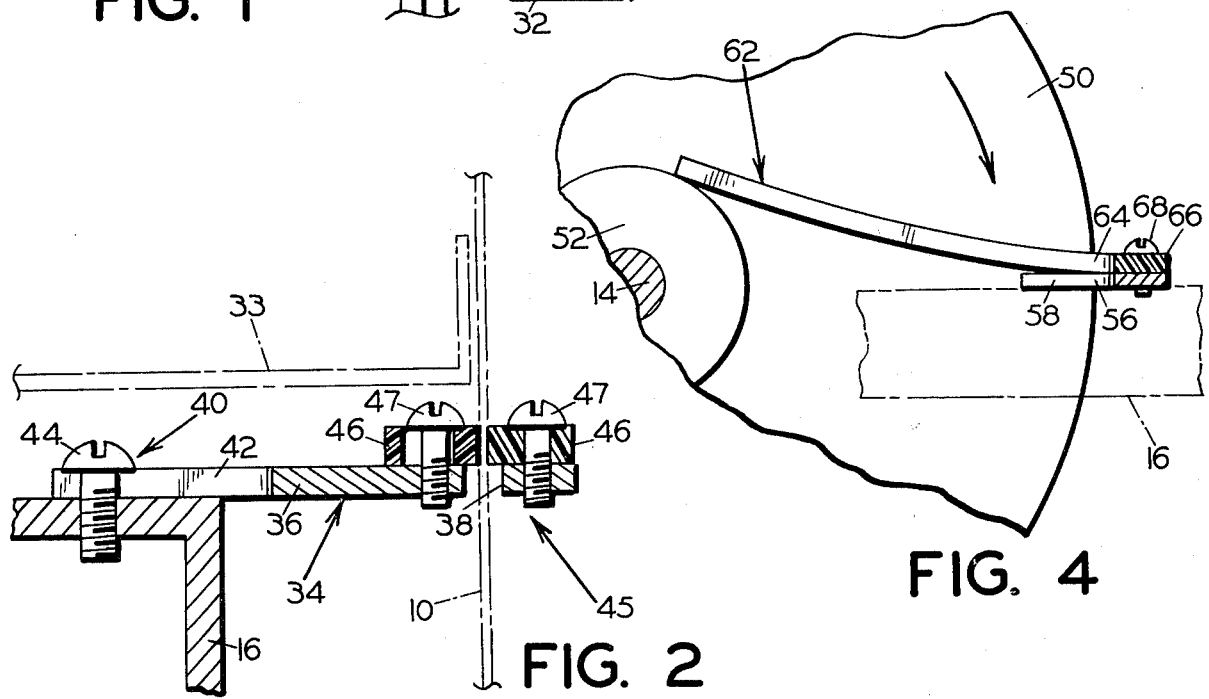
FIG. 2
FIG. 4

BLADE GUIDE AND SLAB SUPPORT FOR LAPIDARY SAW

BACKGROUND OF THE INVENTION

This invention relates to lapidary saws. It pertains in particular to a saw blade guide and slab support for preventing wobble of the blade on lapidary saws.

In the working of rock specimens, particularly the more or less spherical ones such as geodes, it is often desirable to cut from the specimens a thin slab having parallel sides. Lapidary saws and associated saw blades have been developed for cutting such slabs.

Generally, a lapidary saw comprises a rotary, arbor-mounted saw blade, much like a woodworking table saw. Sliding clamp means maintains the orientation of the specimen during the cutting.

Due to the large diameter of the saw blade, which is unsupported at its periphery, blade wobble or localized, lateral blade displacement occurs in most arbor-mounted rotary saws. Blade wobble becomes a particular problem in lapidary saws, however, due to the nature and use of the object being cut. It causes unevenness of surface in the cut slabs. Since the slabs are further polished after cutting, any unevenness or irregularities are magnified and extremely noticeable.

It accordingly is the general object of the present invention to provide a saw blade guide for overcoming this problem and to prevent saw blade wobble in lapidary saws.

It is a further object of the present invention to provide such a blade guide that is easily mounted on existing lapidary saws of various manufacture.

It is a further object of the present invention to provide such a blade guide which makes possible true, straight cutting of rocks of random and awkward sizes and shapes.

It is a further object of the present invention to provide such a blade guide having wear surfaces which are readily replaceable upon rotation.

It is a further object of the present invention to provide such a blade guide that is adaptable for use with lapidary saws having two saw blades mounted in a parallel tandem fashion to facilitate cutting of an intermediate slab therebetween.

It is a further object of the present invention to provide such a blade guide having an integral slab support for holding the intermediate slab during and after cutting.

THE DRAWINGS

The manner in which the foregoing and other objects of the invention are accomplished will be apparent from the accompanying specification and claims, considered together with the drawings wherein:

FIG. 1 is a fragmented plan view showing a typical installation of a first embodiment of the saw blade guide of the present invention.

FIG. 2 is a fragmentary sectional view of the blade guide taken along the line 2—2 of FIG. 1.

FIG. 3 is a fragmentary plan view showing the structure and manner of installation of a second embodiment of the blade guide of the present invention in which the guide serves also as a slab support.

FIG. 4 is a fragmentary sectional view of the blade guide and slab support taken along the line 4—4 of FIG. 3.

GENERAL STATEMENT OF THE INVENTION

The present invention generally provides a blade guide for lapidary saws of the type having an arbor-mounted rotary saw blade. The blade guide comprises holder means, which is attached to the saw table by mounting means, and guide means which is releasably attached to the holder means to guide the saw blade and prevent blade wobble.

The blade guide may be configured for use either with a single saw blade or with dual saw blades mounted in a parallel tandem arrangement to cut an intermediate slab. In the latter case, the guide serves also as a slab support.

DETAILED DESCRIPTION OF A PREFERRED EMBODIMENT

Referring to FIG. 1, the blade guide and slab support of the present invention are intended to be used primarily on a lapidary saw such as is commonly employed for cutting thin, planar slabs from a specimen, such as a geode.

A lapidary saw of this type generally comprises rotary saw blade 10 mounted on arbor 12. The arbor is attached to one end of shaft 14 which is rotatably mounted by a bearing 15 to the saw table 16. The shaft has mounted on its other end pulley 18 which is motor driven by belt 20.

Clamps 24 hold specimen 26 on bed 28 which is slideably mounted on ways 30 to translate the specimen in a direction perpendicular to the saw blade. Threaded handles 32 position the clamps on the bed to secure the specimen therein.

Slab tray 33, shown in phantom, is normally located inwardly adjacent the forward portion of the saw blade to catch the resulting slab after it has been cut from the specimen.

The blade guide of the instant invention is shown in two embodiments for use with different lapidary saw arrangements. The embodiment shown in FIGS. 1 and 2 is utilized with the single saw blade hereinbefore described.

The embodiment shown in FIGS. 3 and 4 is utilized with two or more such saw blades mounted in a parallel tandem manner to allow cutting of an intermediate slab therebetween, simultaneously with the cutting of the normal slab. This embodiment employs the slab support of the present invention to support the intermediate slab during the cutting.

Considering first the former embodiment, the blade guide comprises holder means 34 including rectangular plate 36. The rectangular plate is preferably approximately twice as long as it is wide. A piece of 3/16-inch-thick cold rolled steel 2-inch strap may be utilized for this purpose.

A narrow slot 38 is perpendicularly located in one of the longer sides of the rectangular plate near its end portion. The narrow slot must be wide enough to loosely accommodate the saw blade. However, it may be made considerably wider if desired, to facilitate manufacture. The slot preferably extends slightly past the central portion of the rectangular plate.

The holder means is attached to saw table 16 by mounting means 40. The mounting means comprises elongate slots 42 perpendicularly located in the end of rectangular plate 36 opposite the end adjacent narrow slot 38. Screws 44 configured slideably to engage the elongate slots, communicate therethrough into threaded engagement with saw table 16. Thus, the screws secure the rectangular plate to the saw table when they are in a tightened condition.

Guide means 45 is releasably attached to holder means 34. It comprises semi-resilient blocks 46 fabricated from a self-lubricating material such as nylon, and having substantially planar faces. The blocks are located above rectangular plate 36, and extend partially over narrow slot 38 from each side thereof. The outer semi-resilient block contains a medial hole and the inner block contains a medial slot through which screws 47 pass for threaded engagement with the rectangular plate. The outer block preferably is square so that it provides four renewable side edge wear and guiding surfaces which may be presented to the saw in turn.

The embodiment of the invention illustrated in FIGS. 3 and 4 is similar, except that the lapidary saw includes two or more saw blades rather than one. The other saw elements, including arbor 12, are identical to that utilized in the former embodiment. However, inner saw blade 48 is separated from outer saw blade 50 by intermediate spacer 52.

The specimen is retained and fed in the same manner as in the embodiment shown in FIG. 1, except that it may be positioned differently in order to cut simultaneously the normal slab and an intermediate slab.

In this embodiment, holder means 54 again comprises a rectangular plate 56, but in this instance it includes inner narrow slot 58 and outer narrow slot 60. The inner and outer narrow slots are spaced to accommodate the tandem saw blades and are dimensioned similar to narrow slot 38.

The mounting means in this embodiment is identical to that illustrated in the prior embodiment. Thus, it employs elongate slots 42 and screws 44 which pass therethrough for threaded engagement with saw table 16.

The guide means is also identical to that utilized on the prior embodiment. Semi-resilient blocks 46 are attached by screws 47 to rectangular plate 56. In this embodiment however, they are positioned outwardly of outer narrow slot 60 and inwardly of inner narrow slot 58 and extend partially over the outer and inner narrow slots respectively. The inner semi-resilient block again contains a medial slot and the outer semi-resilient block again contains a medial hole through which screws 47 pass.

Flexible finger 62 is a T-shaped element comprising elongate support 64 with rectangular mounting tab 66 joined thereto at one end. The elongate support is preferably approximately one-half the saw blade diameter in length. Thus it rests on intermediate spacer 52 of the arbor, as shown in FIG. 4, to bias the intermediate slab upwardly during the cutting. The rectangular mounting tab is joined to rectangular plate 56, as by screws 68, so that the elongate support is intermediate the inner and outer narrow slots therein. The flexible finger preferably is made from the same material (nylon) as the semi-resilient blocks. However, it is considerably thinner.

OPERATION

In the operation of both embodiments of the invention, the holder means is attached to the saw table by the placement of screw holes therein, and insertion of screws 44. The holder means is positioned longitudinally so that the semi-resilient blocks are located inwardly from the periphery of the saw blade sufficiently so as not to be in contact with the saw teeth. This prevents the teeth and cuttings from causing immediate wear of the blade guide.

Since the outer semi-resilient block contains a medial hole and thus is not adjustable relative to the holder means, the screw holes should be positioned laterally in the saw table so that the elongate slots in the rectangular plate are located medially thereabove when the outer semi-resilient block is in contact with the outer side of the saw blade. This will allow maximum adjustability of the rectangular plate.

The inner semi-resilient block can then be positioned by means of its medial slot to contact the inner side of the saw blade and screw 47 tightened.

In the embodiments shown in FIGS. 1 and 2, the blade guide is thus ready for use and a slab is cut from specimen 26 in the normal manner. Bed 28 is translated slowly on ways 30 in the direction indicated by the arrow. The cut slab is deposited on slab tray 33.

It will be noted that the semi-resilient blocks, being positioned on both sides of the saw blade, prevent wobble of the blade, thus resulting in straight sides on the cut slab.

In the embodiment shown in FIGS. 3 and 4, the semi-resilient blocks are installed and aligned as above; the outer semi-resilient block outwardly adjacent the outer saw blade and the inner semi-resilient block inwardly adjacent the inner saw blade.

Flexible finger 62 is attached to the rectangular plate with elongate support 64 between the tandem saw blades. Thus, each saw blade is adjacent the elongate support on one side, and one of the semi-resilient blocks on the other, preventing wobble of both blades.

In addition, the elongate support serves to retain the intermediate slab during and immediately after cutting. Since the elongate support rests on intermediate spacer 52, it is urged upwardly biasing the slab slightly against the direction of saw blade rotation to overcome the weight of the slab and allow the saw to make a clean, smooth cut completely through the slab.

Since the blade guide elements are fabricated from a soft material, they eventually will wear to a point where saw wobble again will become objectionable. When this occurs, the inner semi-resilient block can be moved outwardly on its medial mounting slot. The other semi-resilient block may be rotated to provide a new face. In addition the simplicity of these blade guide elements makes their replacement inexpensive when replacement is required.

Having thus described my invention in preferred embodiments, I claim:

1. A blade guide for lapidary saws having dual, parallel, arbor-mounted rotary saw blades, separated by an intermediate arbor, for the cutting of an intermediate slab therebetween, carried by a rigid saw table, the blade guide comprising:
    a. a plate having a slot therein arranged to receive freely the peripheral portions of the rotary saw blades,
    b. means for mounting the plate on the rigid saw table with the rotary saw blades received freely in the slot,
    a first block secured removably to the plate on one side of the slot for sliding engagement with the outer side of one of the saw blades,
    d. a second block secured removably to the plate on the opposite side of the slot for lateral adjustment relative to the slot for sliding engagement with the outer side of the other saw blade, and e. an elongated finger secured removably to the plate and extending inwardly between the saw blades from the outer periphery thereof sufficiently to bear on the intermediate arbor between the saw blades for supporting an intermediate slab cut by and located between the saw blades and to bias the intermediate slab upwardly against the direction of saw rotation, the finger having a width substantially equal to the spacing between the saw blades.

* * * * *